United States Patent [19]

Fryer et al.

[11] 4,292,358

[45] Sep. 29, 1981

[54] HEAT PROTECTIVE BARRIER COMPRISING APERTURED MEMBER HAVING INTUMESCENT COATING

[75] Inventors: Kevin C. Fryer, Feltham; Edgar C. Prentice, London, both of England

[73] Assignee: Blevex Limited, Borehamwood, England

[21] Appl. No.: 90,808

[22] Filed: Nov. 2, 1979

[30] Foreign Application Priority Data

| | | | |
|---|---|---|---|
| Nov. 2, 1978 | [GB] | United Kingdom | 42943/78 |
| Nov. 23, 1978 | [GB] | United Kingdom | 45786/78 |
| Feb. 19, 1979 | [GB] | United Kingdom | 05698/79 |
| Mar. 27, 1979 | [GB] | United Kingdom | 10628/79 |

[51] Int. Cl.[3] .......................... B32B 3/24; B32B 5/20; B32B 15/04

[52] U.S. Cl. .................................... 428/135; 427/173; 427/289; 427/290; 428/136; 428/137; 428/138; 428/247; 428/255; 428/256; 428/913; 428/920; 428/921

[58] Field of Search ............... 428/135, 136, 138, 247, 428/255, 256, 913, 921, 137, 138, 920; 427/173, 289, 290

[56] References Cited

U.S. PATENT DOCUMENTS

| | | | |
|---|---|---|---|
| 3,816,226 | 6/1974 | Finelli | 428/921 |
| 3,873,409 | 3/1975 | Jehier | 428/921 |
| 3,900,625 | 8/1975 | Chen | 428/921 |
| 3,915,777 | 10/1975 | Kaplan | 428/921 |
| 3,934,066 | 1/1976 | Murch | 428/921 |
| 4,015,386 | 4/1977 | Cook | 428/921 |
| 4,058,643 | 11/1977 | Marshall et al. | 428/913 |
| 4,062,160 | 12/1977 | Christison | 428/255 |
| 4,069,075 | 1/1978 | Billing et al. | 428/921 |
| 4,096,304 | 6/1978 | Greengrass | 428/255 |
| 4,107,376 | 8/1978 | Ishikawa | 428/913 |
| 4,170,675 | 10/1979 | Greengrass | 428/256 |
| 4,214,418 | 7/1980 | Smith | 428/921 |

*Primary Examiner*—James C. Cannon
*Attorney, Agent, or Firm*—Sughrue, Mion, Zinn, Macpeak and Seas

[57] ABSTRACT

A heat resistant protective barrier has one or more layers (1) each comprising a support medium in the form of a plurality of closely spaced-apart strands (2) and a heat actuated and resistive intumescent coating (3) on the strands. The support medium preferably comprises an expanded metal mesh (5'').

18 Claims, 12 Drawing Figures

HEAT PROTECTIVE BARRIER COMPRISING APERTURED MEMBER HAVING INTUMESCENT COATING

The present invention relates to heat protective barriers to provide protection against fire hazards, and more particularly to barriers which are of a flexible nature, to enable existing structures to be wrapped or otherwise provided with a barrier.

Whilst it is known to provide a measure of protection against fire by means of heat actuated and resistive intumescent coatings applied to a structure to be protected, several coats of such an intumescent material may need to be applied to give sufficient thickness of intumescent material to give a satisfactory degree of protection. The application of the intumescent coating is usually carried out by spraying or other conventional techniques, and it will be appreciated that to apply the intumescent material to a structure "in situ" must inevitably involve a degree of uncertainty as to the precise thickness of the coating applied and, furthermore, is expensive, mainly due to the labour costs involved in application.

It has been proposed to fire-proof ceilings, partitions and the like with a honeycomb material, the sides of the honeycomb being coated with an intumescent material. It will be appreciated that such a material is generally rigid and therefore not suitable for use where wrapping is the most appropriate way of providing the barrier around a structure.

In order to overcome these and other problems associated with the prior art, and in accordance with the present invention, a heat protective barrier has one or more layers each comprising a support medium in the form of a plurality of closely spaced-apart strands and a heat actuated and resistive intumescent coating on the strands.

Preferably, the barrier will comprise a plurality of layers to provide protection against extremes of heat and fire, but in certain cases it is envisaged that the heat or fire risk may be small and only a single layer necessary therefore.

The closely spaced strands of each layer will preferably comprise an expanded metal material such as an expanded aluminium foil although the strands may be provided effectively by other meshes, woven metal fabrics, plastic meshes, or even a cardboard mesh material.

The intumescent coating may be provided on one or both sides of the strands of each layer, depending on the particular use of the barrier. The intumescent coating is preferably of a lacquer type which provides a degree of flexibility which, in turn, prevents the intumescent coating from flaking off the strands when the layer or layers are flexed in order to form the barrier around an existing structure.

Advantageously, the intumescent coating is applied so that it does not "window", preferably, even at least partially, the apertures between the strands until heat is applied to the barrier. On the application of heat, the coating foams and carbonises, thus at least partially windowing across the apertures between the strands. It will be appreciated that the amount of intumescent coating material applied to the strands can be varied depending on the required use of the barrier although, preferably, the degree of protection will be adjusted by the variation of the number of layers in each barrier. By initially leaving the apertures free of intumescent material, and of course depending on the application, air is enabled still to pass through the layers in normal use, so that there is no insulating effect and build-up of heat prior to the intumescent coating activated by a fire. This is particularly important when the barrier is used as a jacket for protecting a cylinder of inflammable gas or liquid, such as a container for liquid petroleum gas (LPG) where, to enable the evaporation of the liquid gas in normal use, heat needs to be drawn from the surrounding ambient air.

One particular use of a barrier according to the invention lies in the field of LPG pressure container protection. The use of propane or butane for heating and lighting both in small containers on campsites and in large containers for transport or in industry is increasing and thus the potential hazards which they represent are also on the increase. In order to provide a measure of protection against fires which may ultimately, due to the heating and rupture of such pressurised containers, cause a BLEVE type explosion, a container of whatever size can be lined externally with a heat resistant protective barrier according to the invention. It will be appreciated that containers for inflammable liquids or gases other than LPG may also be protected in the same way. Such protection may enable smaller gas containers to be moved from their usual positions externally of a building or caravan (because of the fire hazard) to positions inside, where the gas container is more protected from the elements and from accidental damage, but where, without a heat resistant protective barrier, the gas container would represent an unacceptable explosion hazard.

A further application of the invention lies in the construction industry. In modern building, structural steel requires to be protected from excessive heat such as generated during a fire, and, of course, increasingly, regulations are specifying that partitions, doors, ceilings and the like also provide sufficient resistance to the path of a fire to enable personnel to be evacuated safely over a given period of time. The result of such building regulations is to increase significantly, the amount of material which has to be used in the construction of buildings and, as a result, the overall cost and weight of the structure and internal fixtures in the building is also increased. The increase in weight is, of course, reflected in the increased size of the structual components which have to be enlarged to provide adequate support. By protecting structrual components with a heat barrier in accordance with the present invention, it is believed that overall loadings can be significantly reduced. For example, to provide sufficient resistance to fire, doors walls and ceilings etc are constructed to be much thicker than is actually required for the function of the door, wall or ceiling. The increased thickness, in case of doors usually timber, means a corresponding increase in the weight which not only makes the actual manhandling of the fixture more difficult during the construction of the building, but also increases the weight of the internal fixtures requiring a concomitant increase in the strength of the structural building components.

By means of the invention, a fire door, wall, ceiling or the like may be significantly lightened as a result of a construction which has a pair of outer skins providing the external surface and, between the skins, a barrier according to the invention. The overall weight and thickness of, for example, a fire door can therefore be significantly reduced whilst maintaining the regulation fire resistance.

Where walls are constructed with a supporting framework and a skin of plaster or other similar material, the plaster may be backed with a barrier according to the invention to provide a significant increase of resistance against fire. In comparison, although plaster provides resistance against heat for a short time, to provide the regulation fire resistance plaster thicknesses up to an inch may have to be used where the plaster is rendered onto a standard or conventional expanded metal lath. By pre-coating the expanded metal lath with an intumescent heat resistive material, the thickness of plaster required can be significantly reduced as the lath provides not only the support for the plaster but also a degree of heat or fire resistance.

Existing non-fireproof and partially fireproof materials may also be effectively fire-proofed by the application of a barrier according to the invention. For example, plasterboard, wall board, chipboard, fiberboard or other sheet materials may have a layer of expanded metal mesh applied to the back thereof, the metal mesh again having strands coated with a heat actuated and resistive intumescent coating, to provide a barrier in accordance with the invention. Alternatively, the barrier may even be provided internally of mouldable materials such as foam plastics, glass reinforced plastics or the like.

It will be appreciated that the various applications mentioned above are merely by way of example and are not limitative of the field of application of the present invention.

In some cases, the barrier may additionally comprise layers of closely spaced strands which are uncoated. Depending on the particular application, the additional uncoated layers can be provided to aid the conduction of heat away from the coated layers of the barrier, paticularly where the layers are formed by an expanded metal mesh.

The barrier according to the invention may also fulfil a fire-extinguishing role by virtue of the "windowing" of the spaces between the strands by the intumescent material when it is exposed to heat or fire. Similarly, the barrier may also provide a self-sealing facility.

A further particular advantage of a heat barrier constructed in accordance with the present invention lies in the fact that the coating process will preferably be carried out in the factory so that a close control of the thickness of intumescent material applied to the strands can be achieved to ensure consistency of the degree of fire protection provided by a heat barrier of the invention.

It is envisaged that, when the strands are provided in the preferred form of an expanded metal foil, the intumescent material can be coated on the strands of the expanded metal either after the metal has been expanded, before expansion takes place or at an intermediate step in the expansion process. In the latter case, the material to be expanded may be slit (which slightly deforms the sheet material) whereafter the coating of intumescent material is applied, and the coated slit sheet then expanded in a conventional way on conventional machinery. This method has the advantage that it may be easier to control the thickness of the intumescent material on the unexpanded sheet than if the sheet is coated after expansion. Coating the sheet prior to slitting is also a possibility, but the actual slitting process may damage the coating and, also, as the coating is extremely thin, the material tends to flow over a plain sheet causing a reduction of thickness towards the centre of the sheet and an increase of thickness towards the edge. By first slitting the sheet, the flowability of the material on application is restricted.

Further details of a heat barrier according to the present invention will now be described with reference to the accompanying drawings in which.

Figure 1:
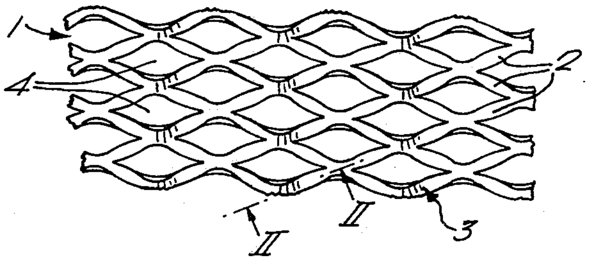
FIG. 1 shows a single layer of a heat barrier.

FIG. 1 shows a single layer 1 of a heat barrier according to the present invention, the layer 1 comprising a substrate or sheet of expanded aluminium foil comprising a plurality of strands 2 having a coating 3, on both sides, of heat resistive and actuated intumescent material. The intumescent material 3 coats each of the strands but does not "window" across the apertures 4 which separate the individual strands of the layer.

The particular mesh used in the test described comprises flexible aluminium foil of 0.003 inch thickness with apertures expanded to 14 mm length and 16 mm width. The width of the strands between the apertures was 1.4 mm. The coating of intumescent material was supplied at 400 grams per square meter wet, which when dry gives about 260 grams per square meter.

The intumescent material may be solvent based, but it has been found that water based intumescent materials are more suitable due to their ease of application and also due to the fact that solvent based intumescent materials usually give off toxic fumes during the coating process. In particular, a suitable water based intumescent material comprises the following materials.

Styrene Acrylic co-polymer—23%
Surfactant—0.1%
Chlorinated Paraffin Wax with 70% Chlorine—4.31%
Chlorinated or Brominated Alcyl or Phenyl Phosphate (e.g. Chloropropyl Phosphates)—4.91%
Defoaming Agent—0.6%
Titanium Di-oxide—3.23%
Technical Grade Di- and Tri-Penta-Erythritol—6.33%
Melamine—6.7%
Ammonium Polyphosphate—21.75%
Film Forming Agent—5.97%
Water—23.1%

The above percentages are by weight and the total solids content by weight of the above material is 57.8% and the volume percentage of solids 47.1%. The material has a specific weight of 1.25.

Figure 3:
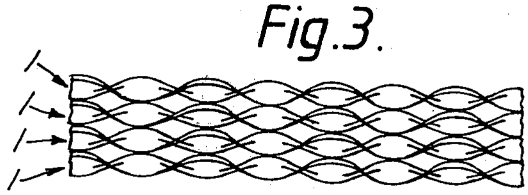
FIG. 3 is an end elevation of a barrier according to the present invention.
Figure 2:
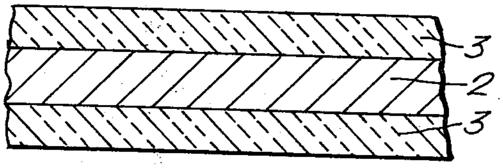
FIG. 2 is a cross section on the line II—II in FIG. 1.

FIG. 3 shows a heat barrier comprising a number of layers 1 formed as described above, the plurality of layers providing increased resistance to heat. The layers may or may not partially nest.

Figure 4:
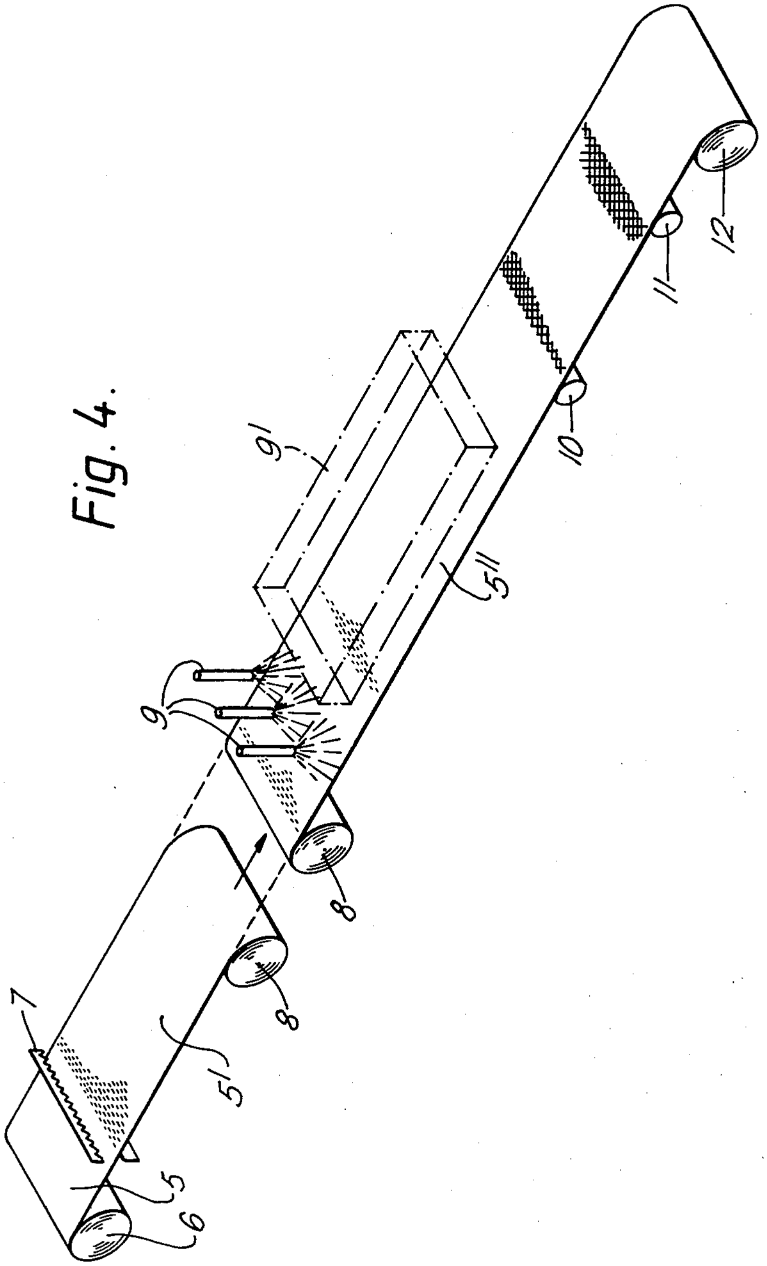
FIG. 4 is a schematic diagram of a method of producing a heat barrier according to the present invention.

FIG. 4 shows, diagrammatically, one method of producing material for a heat barrier according to the present invention. Sheet foil material 5 is fed from a coil 6 to a slitting machine 7 which may either be of the serrated knife type as diagrammatically indicated or of the conventional rotary type. The slit sheet 5' can then be coiled for temporary storage. The re-coiling of the slit material increases the flexibility in production and enables, for example, a single slitting machine to produce material for feeding through a plurality of coating machines or vice versa. In some circumstances it may be possible to do away with the re-coiling. The slit material 5' is then fed (from the coil 8 or directly depending on the method) beneath a transverse row of spray heads 9 which spray intumescent material onto the slit sheet 5'. Additional nozzles (not shown) may be provided on the other side of the foil should it be required to coat on both sides as will be preferred in some circumstances.

The coated foil 5'' is then fed through a drying section 9' so that the intumescent material is dried onto the foil. Thereafter, the material is fully expanded by, for example, being stretched by a pair of differential rollers 10 and 11 operating at different speeds (the roller 11 faster than the roller 10) and the finished material is then stored in a coil 12.

It will be appreciated that the method of applying the intumescent material to the foil may vary and in particular, the intumescent material may be applied prior to the slitting or alternatively, after the final expansion of the foil.

Figure 5:
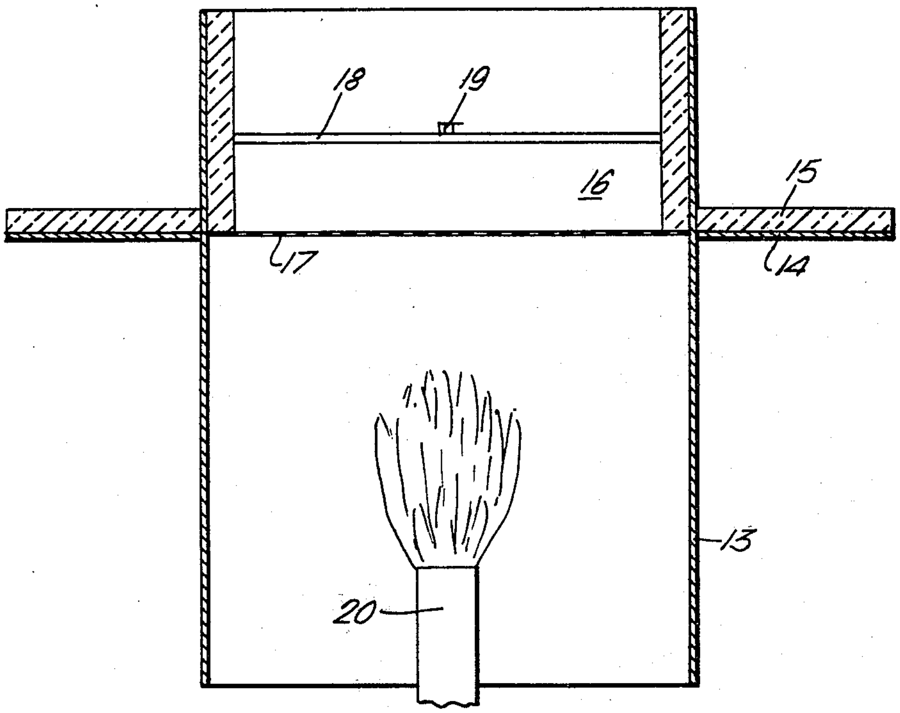
FIG. 5 is a cross section through a test rig for testing samples of heat barriers.

The effectiveness of a heat barrier comprising different numbers of layers has been tested in a rig as shown in FIG. 5.

The rig comprises a square-sectioned tube 13 of 1/16 of an inch stainless steel, the tube 13 carrying a heat shield 14 of similar material and insulation 15, ¼ of an inch thick. The insulation 15 is provided to enable the heat to be concentrated on a sample of heat barrier 16 which is supported by a large-apertured mesh 17 and beneath a sixteen gauge steel plate 18. The plate 18 serves to support a thermocouple 19. The stainless steel tube 13 is 6 inches square and has a height of 9 inches.

At lower end of the tube a gas torch 20 is located to provide, from a liquid petroleum gas source, a flame against the underside of the test sample.

All the samples were formed of layers of coated mesh as previously detailed and the temperature of the flame closely adjacent the underside of the test sample was about 1050° C.

Figure 6:
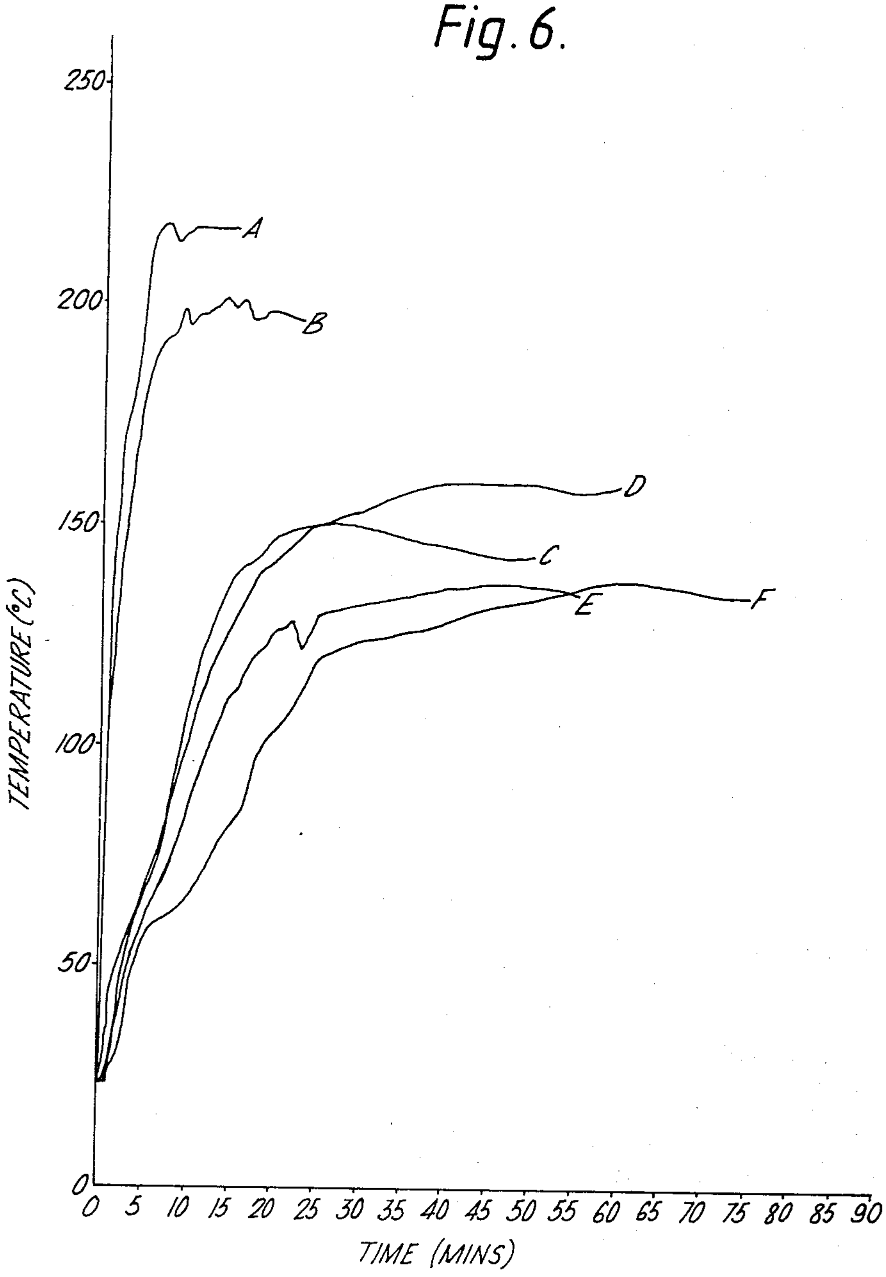
FIGS. 6 and 7 are graphs of temperature versus time for various samples under test in the test rig shown in FIG. 5.
Figure 7:
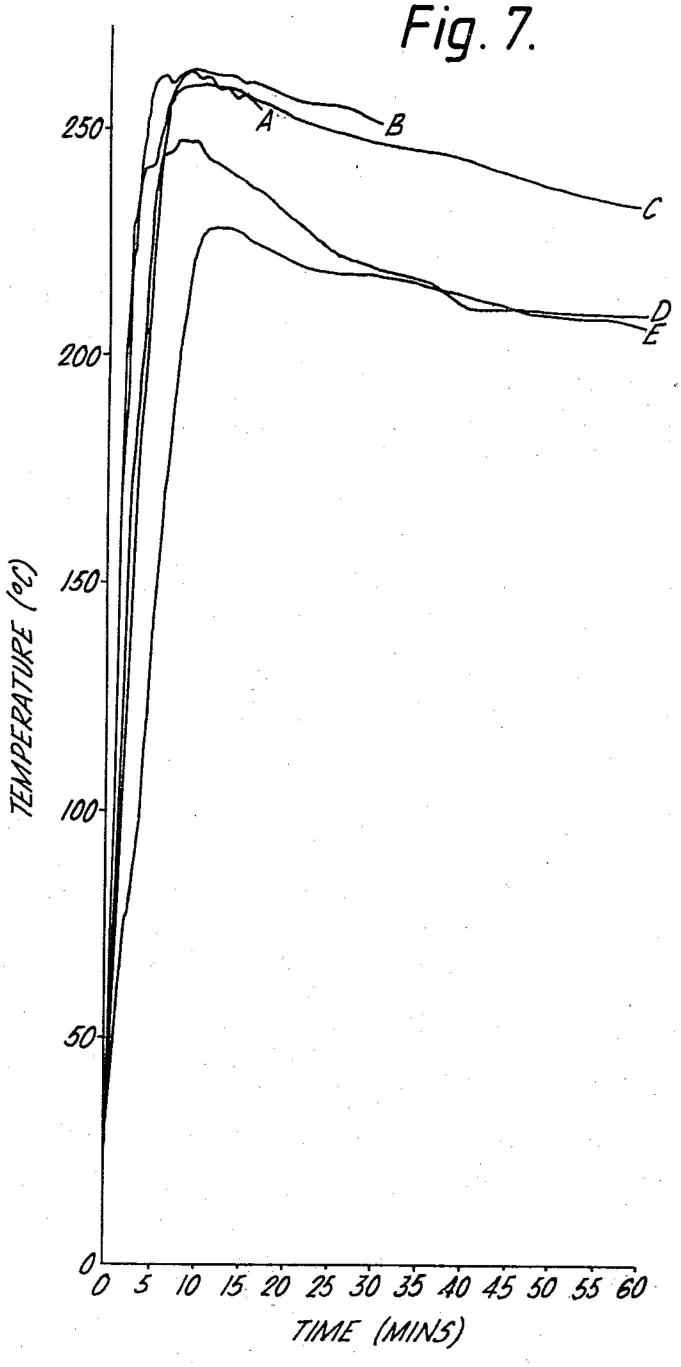

FIGS. 6 and 7 illustrate the increasing effectiveness of heat barriers according to the invention with increasing numbers of layers. FIG. 6 shows the temperature of the termocouple 19 in degrees centigrade over a varying period of time for six heat barriers having different numbers of layers. The numbers of layers corresponding to the lines are as follows:

A—one layer
B—three layers
C—seven layers
D—ten layers
E—twelve layers
F—thirteen layers All the above samples comprised layers of expanded aluminium foil coated on both sides. FIG. 7 illustrates a further set of tests where the foil of each layer was only coated on one side. The number of layers in the samples was as follows:

A—two layers
B—three layers
C—five layers
D—seven layers
E—ten layers

It will be seen from FIGS. 6 and 7 that, with increasing numbers of layers the reduction in heat across the barrier is increased to provide increased protection against the heat from the gas torch.

It will be appreciated that the large heat drop (from about 1050° C. to about 250° C. and below) indicates the high resistance of the heat barriers to fire. The thermocouple 19 for measuring the temperature on the upper side of the sample was supported on the plate 18 to simulate a practical example of the heat barrier when in position say around a sheet metal construction such as a storage tank and also to provide a fixed locating point for the thermocouple to ensure consistency of experimental results.

Whilst it has previously been mentioned that a heat barrier according to the invention has numerous applications, one of those for which the barrier has been specifically designed is LPG containers and tests have been carried out independently by the U.K. Health and Safety Executive to determine the effectiveness of the present invention. FIGS. 8 to 12 relate to these tests as does the following description.

The object of the test was to confirm the protection afforded by a heat barrier according to the present invention when used as an external cladding to propane pressure storage containers. Two propane containing tanks 13 of the same dimensions and construction were used, one being protected by a heat barrier 14 and one being unprotected. In both tests heat was applied at X by a propane flame lance arranged to impinge on the centre of the domed end of the container 13. A steel sheet heat shield 15 was fitted around the container about a quarter of the distance along the container from the heated end to concentrate the heat and to protect the instrumentation. In both tests the tank contained 200 liters of liquid propane 16. Both tanks had standard LPG fittings in the form of a standard 1¾ inch ACME thread standard propane filler valve 17; an air bleed/-level indicator 18; a ⅝ inch BSP L/H standard propane draw-off valve 19 (with relief valve blanked off); and a 1 inch relief valve 20 set at 375 psig. The wall thickness of the containers was ⅜ inch.

The protection afforded to the first tank comprised 15 layers of expanded aluminium foil mesh to form a heat barrier 14 according to the present invention, the inside of the barrier being slightly spaced, by a ribbed expanded metal material 21, from the wall of the container. An external cladding of sheet steel 22 was provided both for weather proofing and for secure containment of the heat barrier, the sheet steel 22 being similarly spaced by ribbed expanded metal material 21 from the heat barrier 14.

Figure 9:
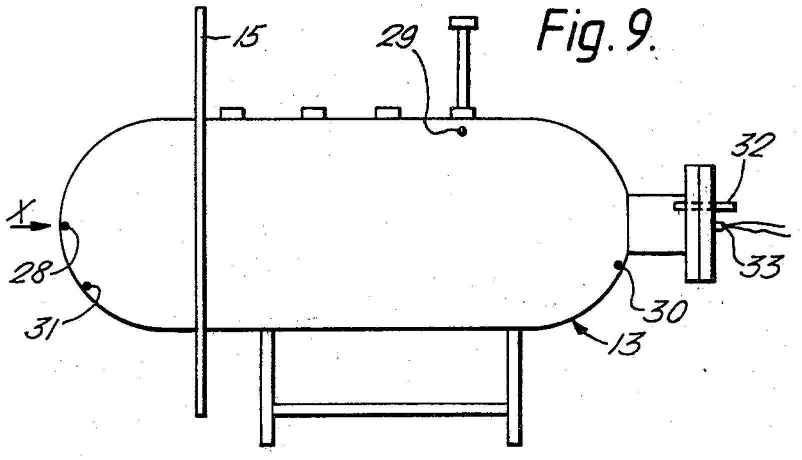
FIG. 9 shows an unprotected cylinder.
Figure 8:
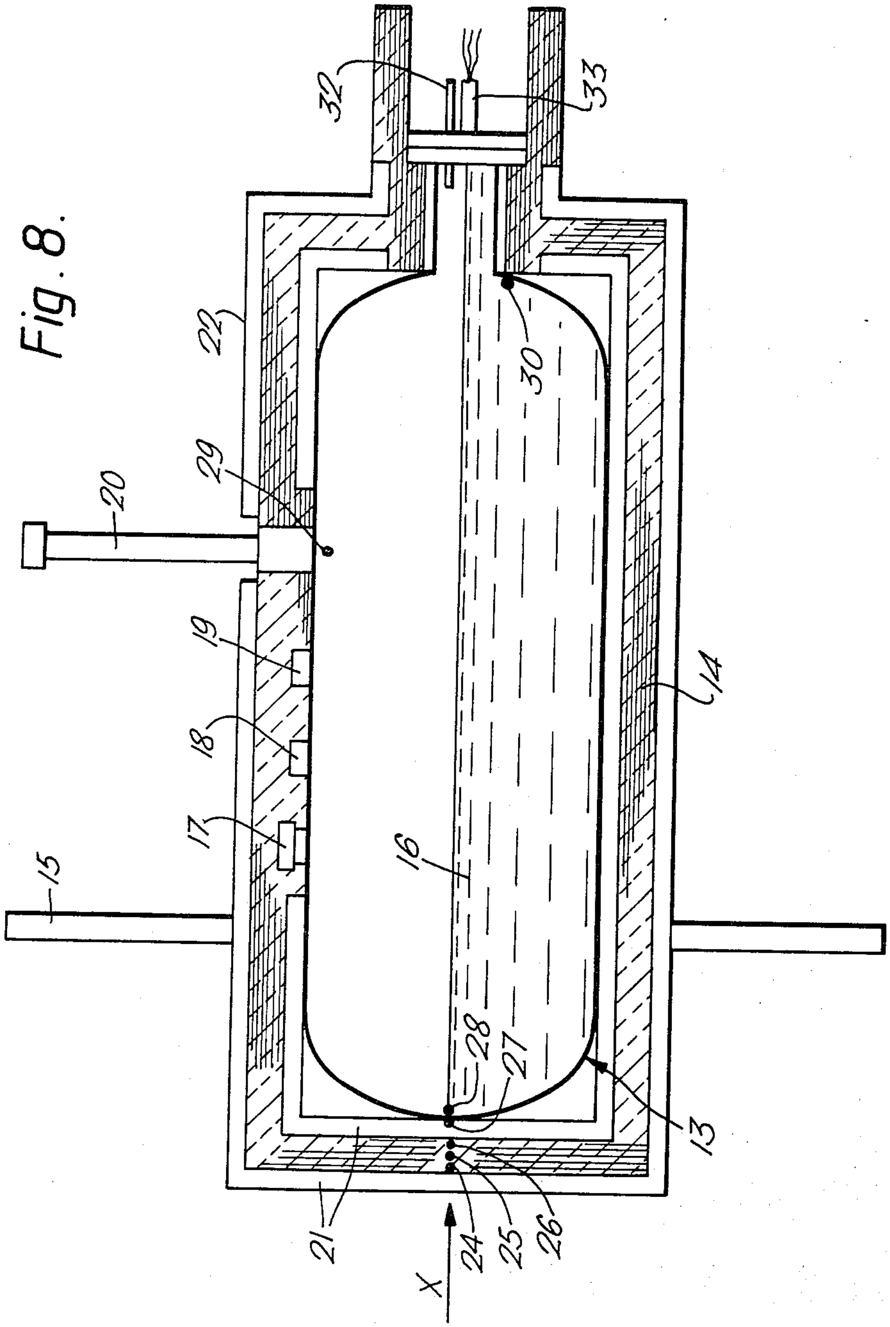
FIG. 8 shows a liquid petroleum gas container protected by a heat barrier according to the present invention.

Temperature sensors 24 to 31 were located as shown in FIGS. 8 and 9, the temperature sensors being mineral insulated type K nickel chrome-nickel aluminium thermocouples in a 25/20 chromium nickel sheath. A pressure sensor 32 of the PIODEM strain gauge transducer type UP 4 500 psi was also located as shown. All instrumentation leads were led to the end of the tank remote from the flame and from there through a protected cable 33.

Sensors 24, 25 and 26 were located within the heat barrier itself under, respectively, three, seven and twelve layers of the coated foil mesh. Temperature sensors 27 and 28 were welded onto, respectively, the outside and inside of the tank.

The thermal output of the propane lance during the tests was calculated to be of the order of 4.5 to 5 MW. In the test on the unprotected container after approximately three minutes the relief valve lifted and closed releasing a small puff of grey vapour and immediately reopened releasing vapour which ignited and burned with a flame about 25 feet in length. The flame burned steadily for about eight minutes and then diminished until it went out after nine minutes. Other flames could be seen at various points around the tank fittings and underneath the tank, but their source could not be identified from the remote positions necessary for safety. FIG. number 10 is a temperature/time graph for sensors 28, 29, 30 and 31 for the test on the unprotected tank, the time/pressure figures being shown in FIG. 11 both for the test on the unprotected (U.T.) tank and the test on the protected tank (P.T.).

On testing the protected tank, after fourteen minutes the flame lance was extinguished but restarted about one minute later and then burned for a total of 25½ minutes. During the burn incandescent fragments could be seen being thrown about which afterwards where indentified as concrete which had been burned out of a concrete test pad on which the container was located. Nothing else could be seen and the relief valve did not open. Because of the break in the burn at fourteen minutes readings after this time could not be considered as following the same pattern as those before. FIG. number 12 shows the time/temperature figures for sensors 24 to 30 on the protected container.

At the fourteen minute point the torch performance was changed by a fault in the vaporiser, liquid propane being delivered and burned. The rate of use of propane was considerably increased, but it was considered that it burned inefficiently and although this combination probably resulted in little change in the heat output the results after fourteen minutes are shown only in dotted line.

In the unprotected vessel the propane had boiled off after eleven minutes causing the pressure fall, the temperature on the inside of the container at sensor 28 being 225° C. and rising rapidly. After twenty minutes burn the temperature shown by sensor number 28 was 640° C. No BLEVE occured as the container strength was sufficient to withstand these pressure/temperature conditions due to the operation of the relief valve. In the second test the relief valve did not open up to twenty minutes burn and as the pressure recorded at that time was only about 110 psi and rising very slowly it would have been a considerable time before the relief valve pressure could have been reached even if the torch could have been continued.

Figure 10:
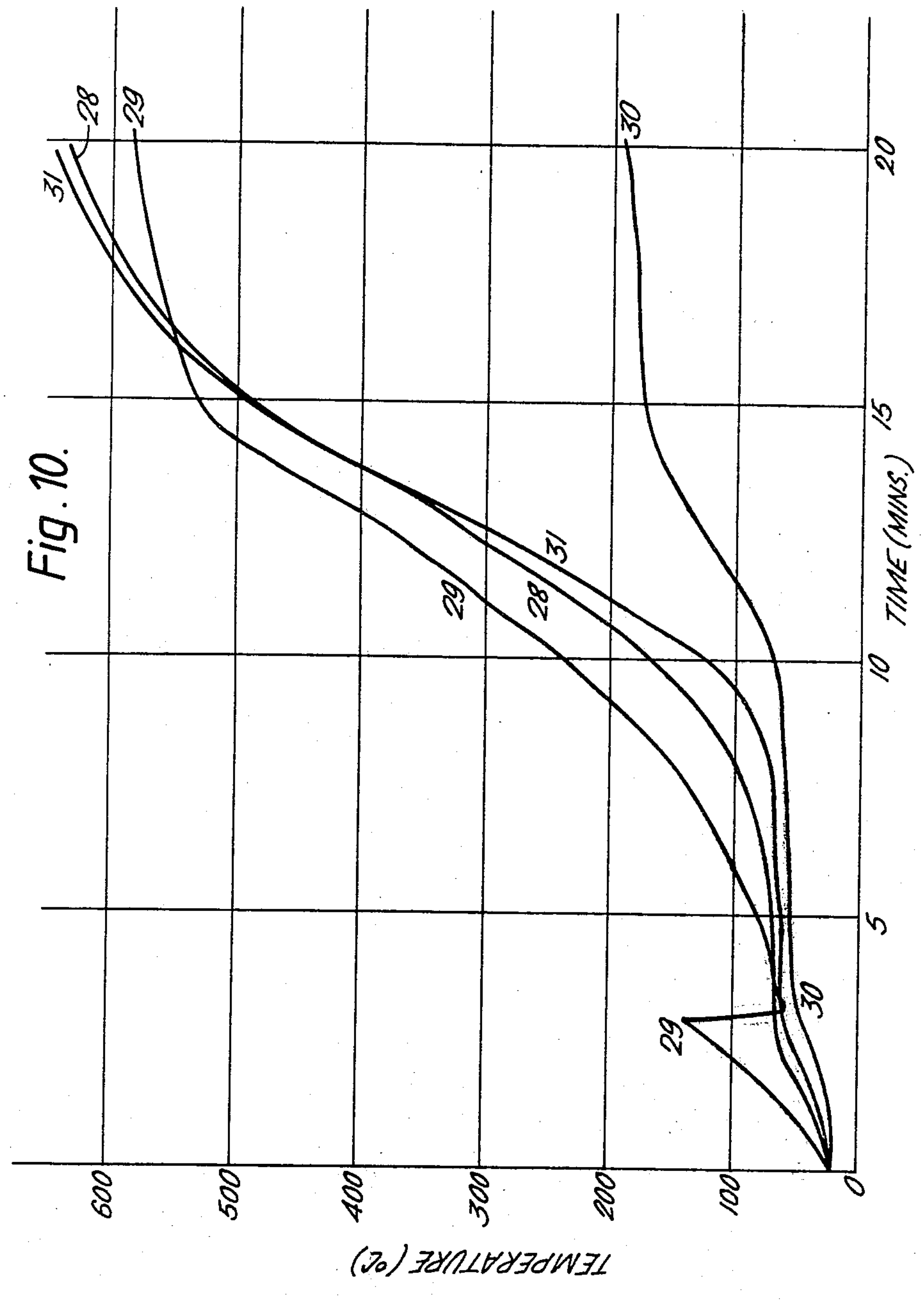
FIGS. 10, 11 and 12 are graphs of tests carried out on the cylinders shown in FIGS. 8 and 9 to determine the effectiveness of the heat barrier.
Figure 11:
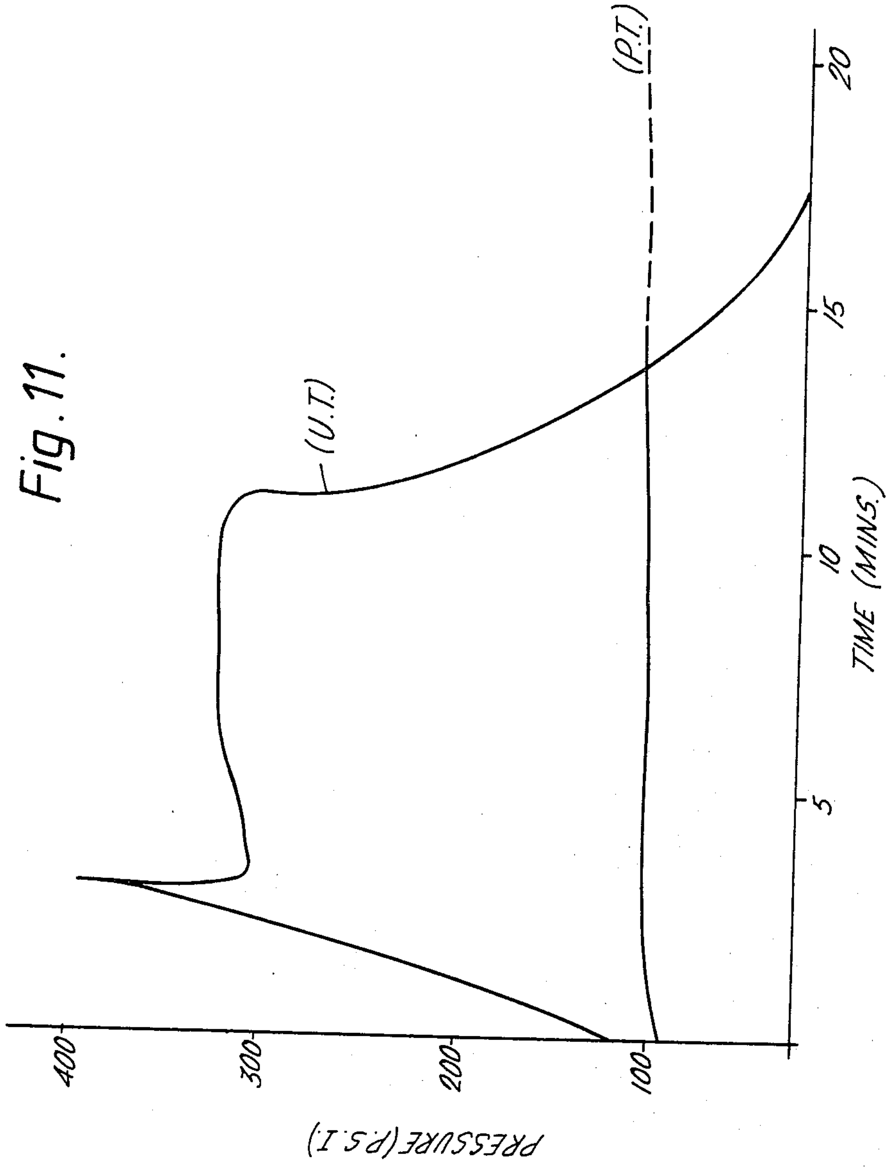
Figure 12:
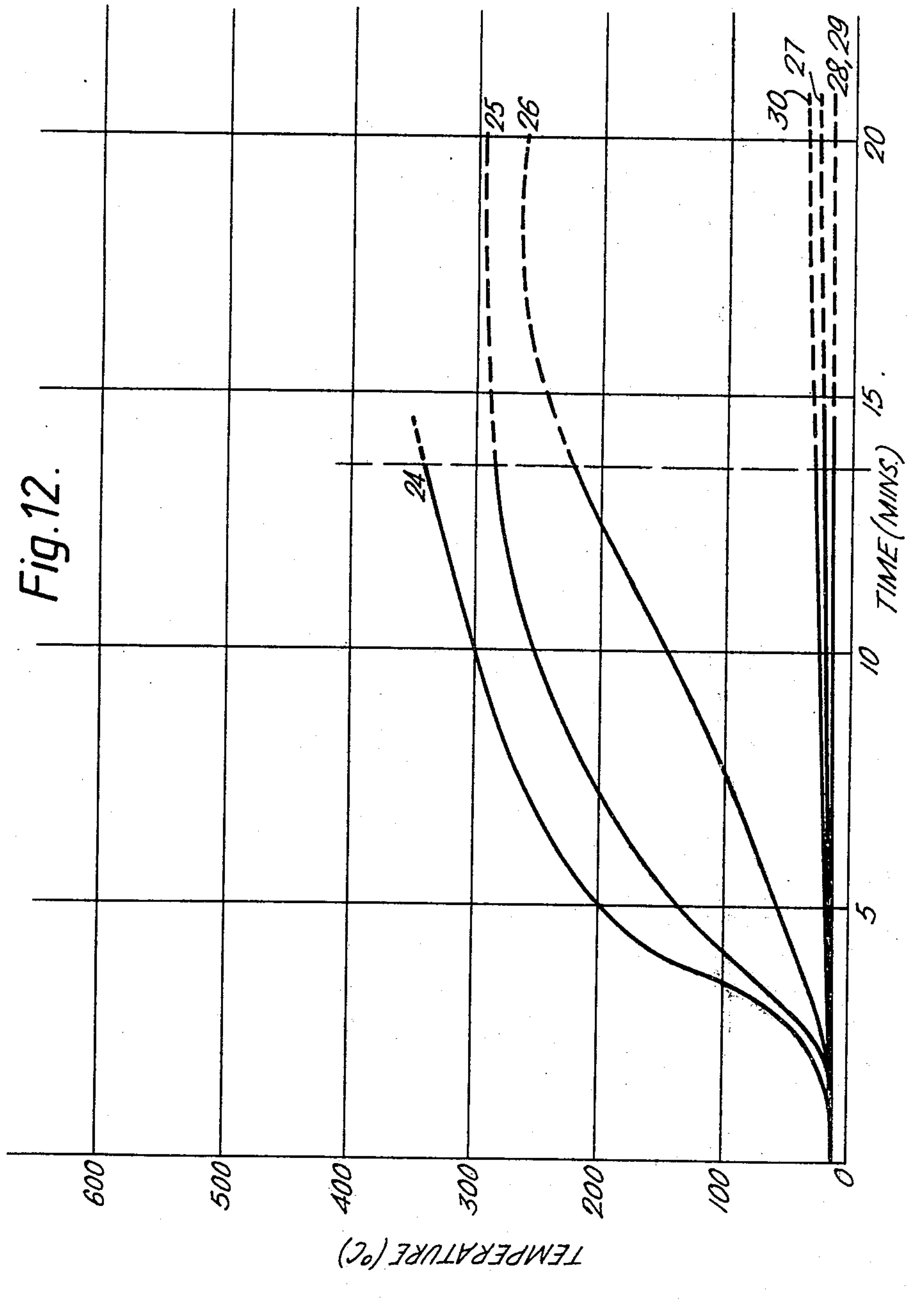

It will be appreciated from a comparison of FIGS. 10, 11 and 12 that the pressure and temperature rises in the protected container were minimal compared with the corresponding figures for the unprotected container and it is considered that the tests confirm that a high degree of protection can be afforded by means of a heat barrier according to the present invention.

We claim:

1. A heat resistant and protective barrier having at least one layer, said at least one layer comprising: a free and unattached carrier substrate in the form of a sheet material having a plurality of spaced-apart strands defining therebetween a plurality of apertures, and a heat actuated and resistive intumescent coating disposed on said substrate, said substrate comprising the sole supporting means for said intumescent coating.

2. A barrier according to claim 1, comprising a plurality of said layers.

3. A barrier according to claims 1 or 2, wherein said heat actuated and resistive intumescent coating covers only said strands of said substrate, said apertures between said strands being free of said coating.

4. A heat resistant and protective barrier having at least one layer, said at least one layer comprising: a carrier substrate in the form of a sheet material having a plurality of spaced-apart strands defining therebetween a plurality of apertures, and a heat actuated and resistive intumescent coating disposed on only said strands of said substrate, said apertures between said strands being free of said coating.

5. A heat resistant and protective barrier, comprising: a plurality of layers, each of said layers including a carrier substrate in the form of a sheet material having a plurality of spaced-apart strands defining therebetween a plurality of apertures, and a heat actuated and resistive intumescent coating disposed on said substrate.

6. A barrier according to claims 1, 2, 4 or 5, wherein said substrate comprises an expanded metal mesh.

7. A barrier according to claim 6, wherein said substrate comprises an expanded metal foil mesh.

8. A barrier according to claims 1, 2, 4 or 5, wherein said substrate comprises a non-heat-conductive mesh material.

9. A barrier according to claims 1, 4 or 5, further comprising a plurality of additional layers, each of said additional layers comprising only a substrate in the form of a sheet material comprising a plurality of spaced-apart strands defining therebetween a plurality of apertures.

10. A barrier according to claim 9, wherein each of said additional layers comprises an expanded metal mesh.

11. A barrier according to claims 1, 2, 4 or 5 wherein said layers are flexible.

12. A barrier according to claims 1, 2, 4 or 5 further including at least one protective outer skin.

13. A method of forming a heat barrier, said method comprising: coating a free and unattached carrier substrate in the form of a sheet material having a plurality of spaced-apart strands defining therebetween a plurality of apertures with a heat actuated and resistive intumescent material, said substrate comprising the sole supporting means for said intumescent coating.

14. A method according to claim 13, wherein only said strands of said substrate are coated with said intumescent material.

15. A method according to claim 13, wherein said substrate comprises an expanded metal mesh.

16. A method according to claim 15, wherein said intumescent material is applied to a metal sheet which is thereafter slit and expanded.

17. A method according to claim 15, wherein a metal sheet is cut to form slits, said intumescent material is applied to said slit sheet, and said slit sheet is thereafter expanded.

18. A method according to claim 13, further comprising stacking a plurality of layers of said coated substrate one on top of another.

* * * * *